No. 755,154. PATENTED MAR. 22, 1904.
E. A. MOORE.
COKE QUENCHING AND BLEACHING APPARATUS.
APPLICATION FILED SEPT. 18, 1902. RENEWED AUG. 26, 1903.
NO MODEL. 9 SHEETS—SHEET 1.

Witnesses
Franck L. Orrand
W. Parker Reinohl

Inventor
Edwin A. Moore
By
D. C. Reinohl
Attorney

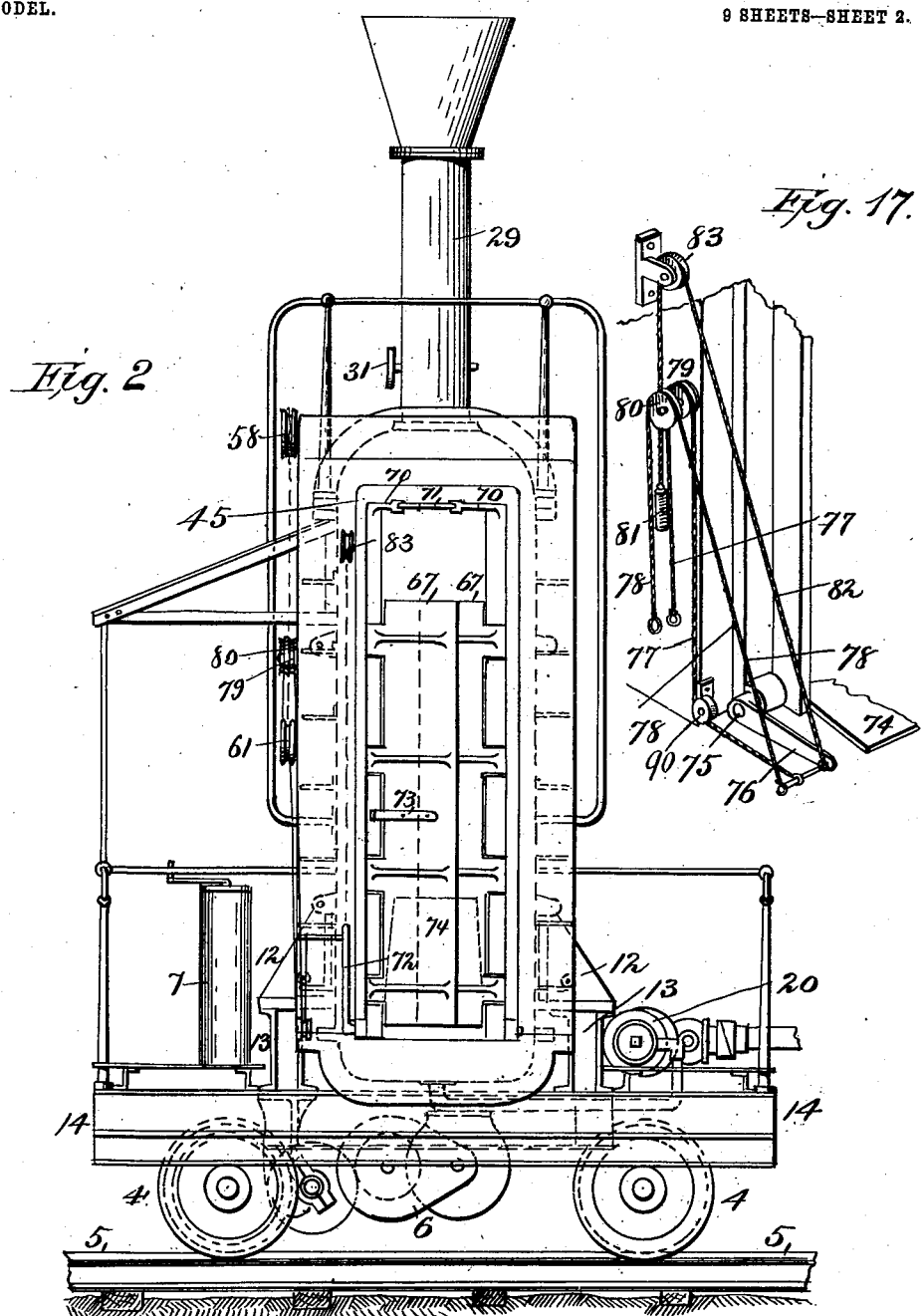

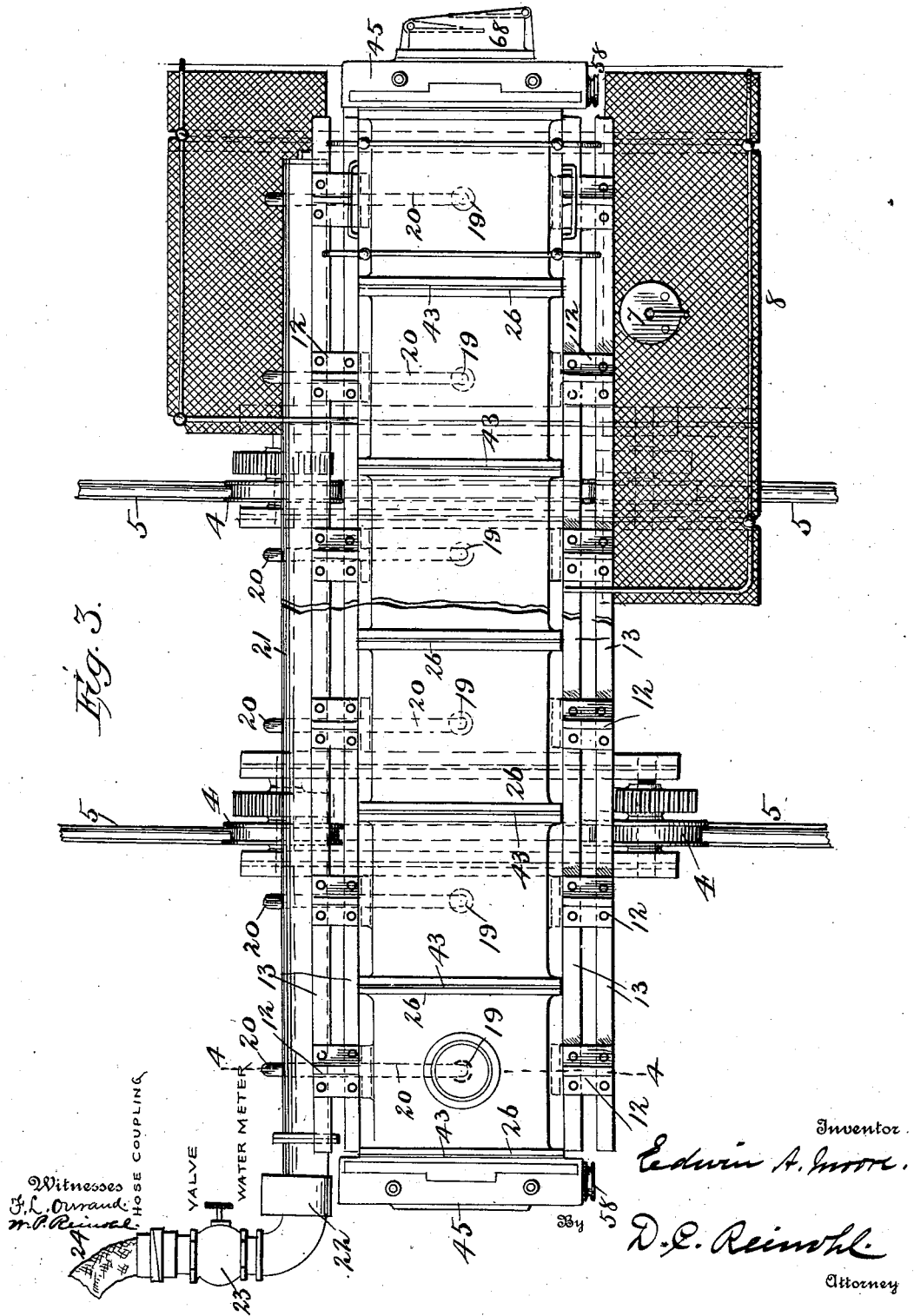

No. 755,154. PATENTED MAR. 22, 1904.
E. A. MOORE.
COKE QUENCHING AND BLEACHING APPARATUS.
APPLICATION FILED SEPT. 18, 1902. RENEWED AUG. 26, 1903.
NO MODEL. 9 SHEETS—SHEET 4.
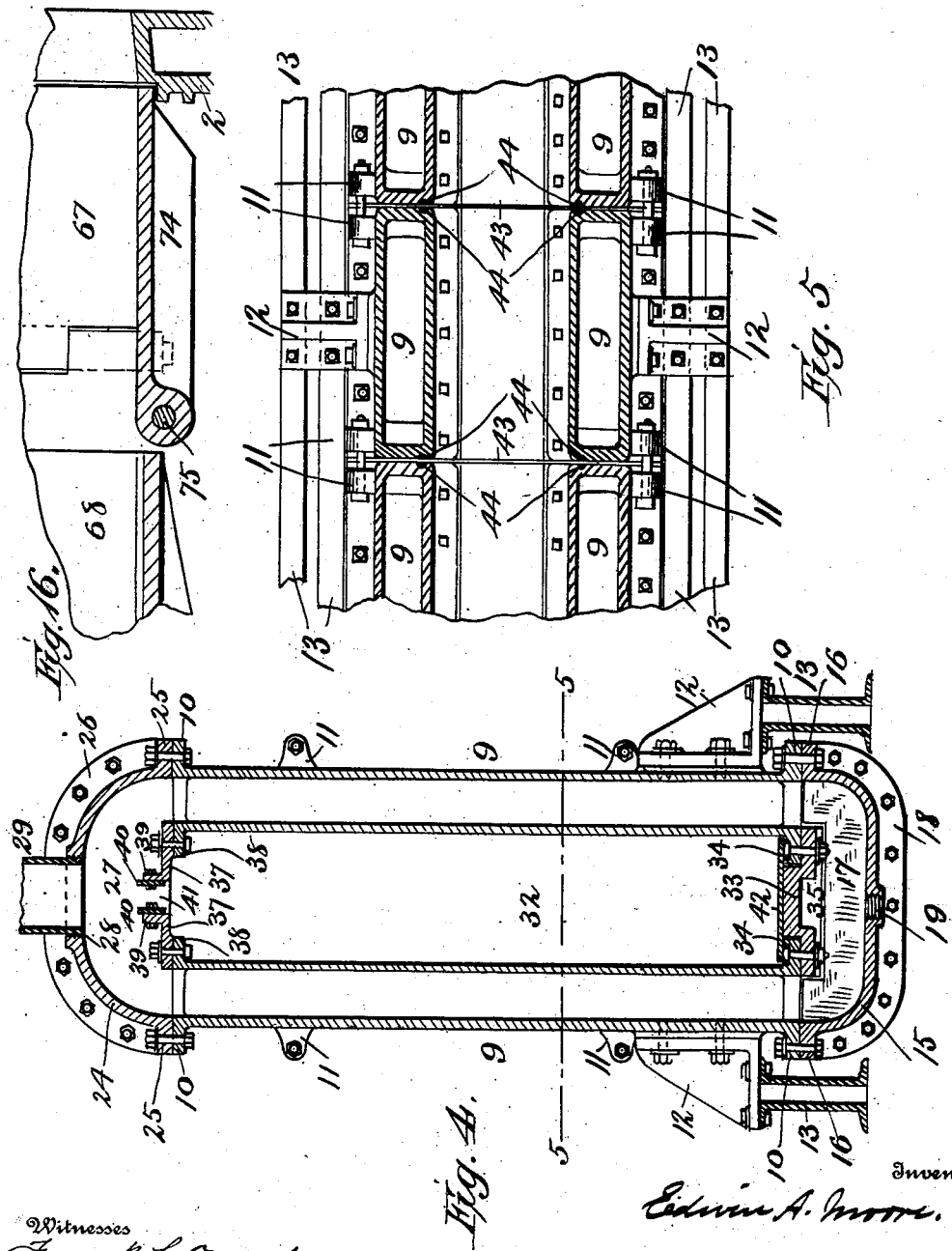

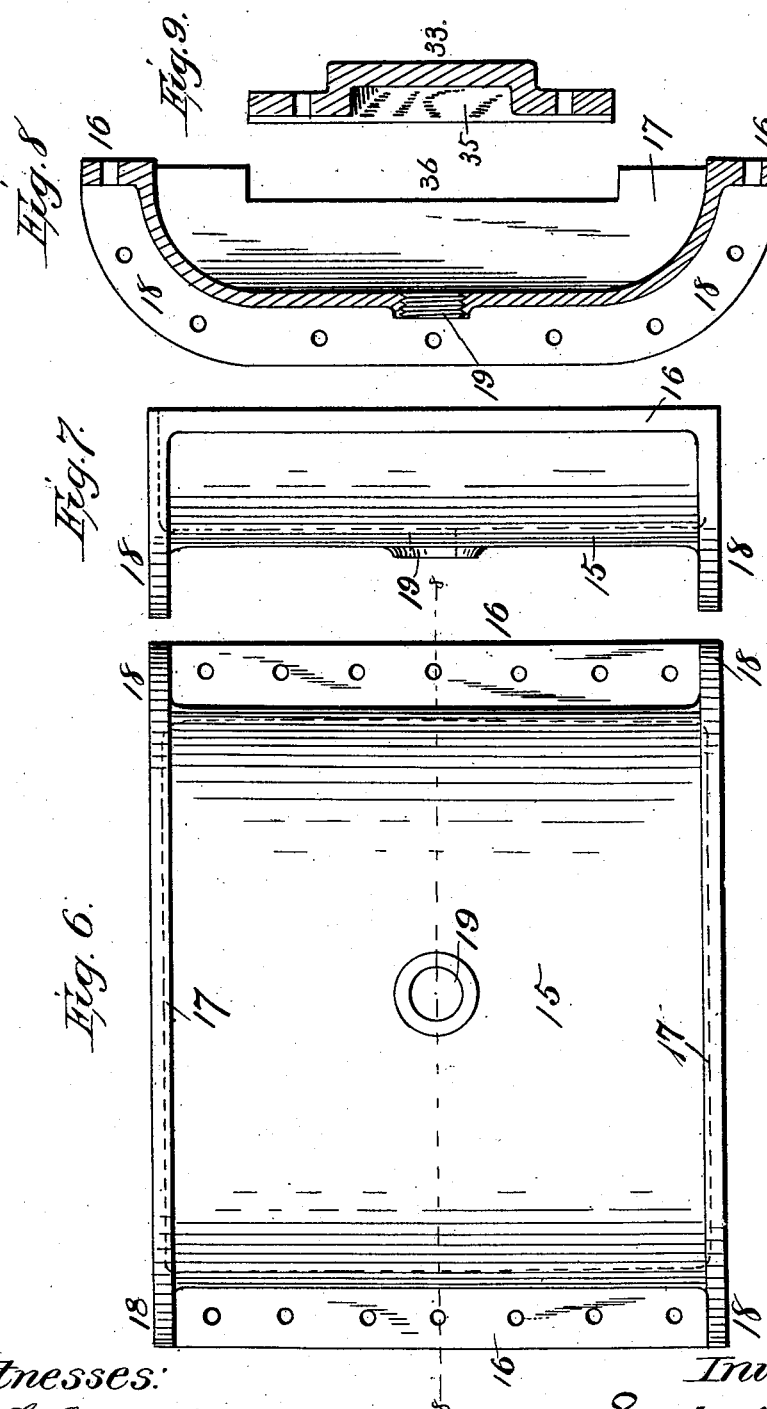

No. 755,154. PATENTED MAR. 22, 1904.
E. A. MOORE.
COKE QUENCHING AND BLEACHING APPARATUS.
APPLICATION FILED SEPT. 18, 1902. RENEWED AUG. 26, 1903.
NO MODEL. 9 SHEETS—SHEET 6.

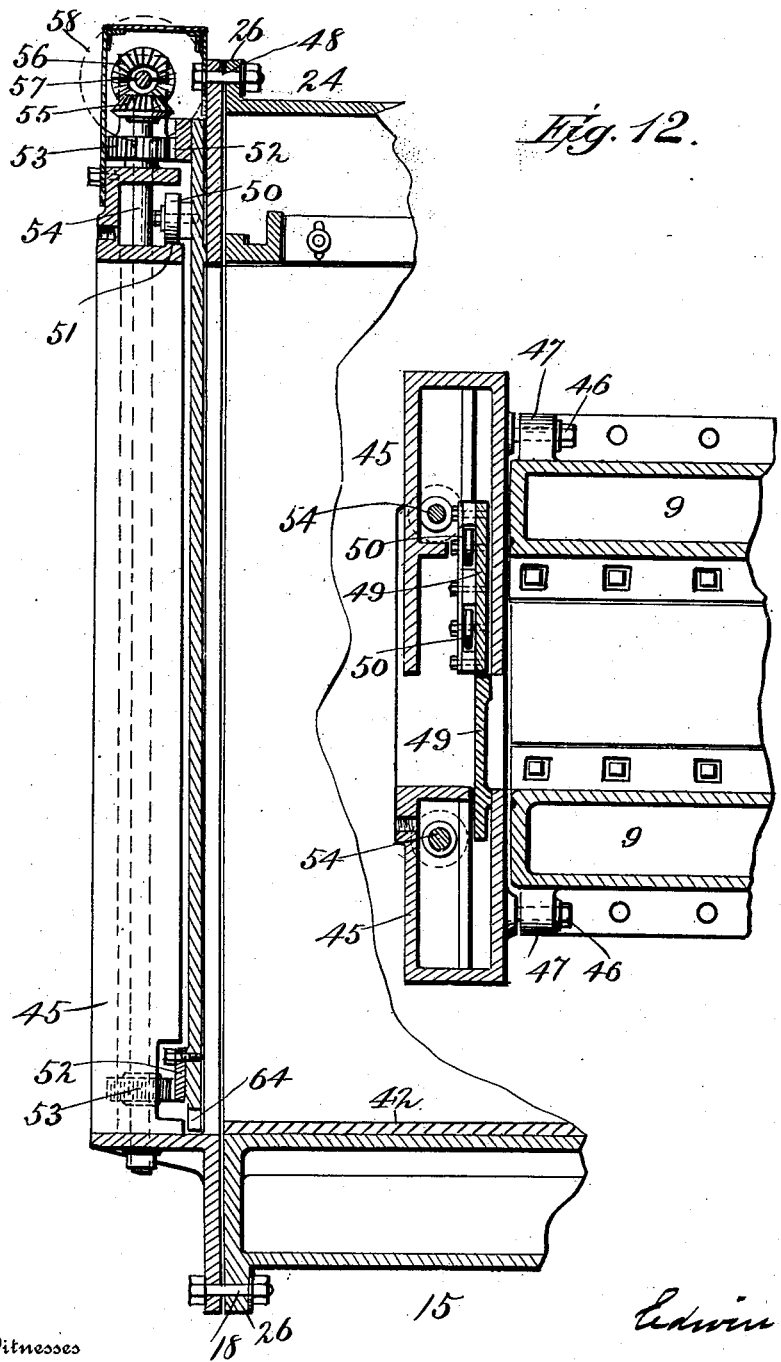

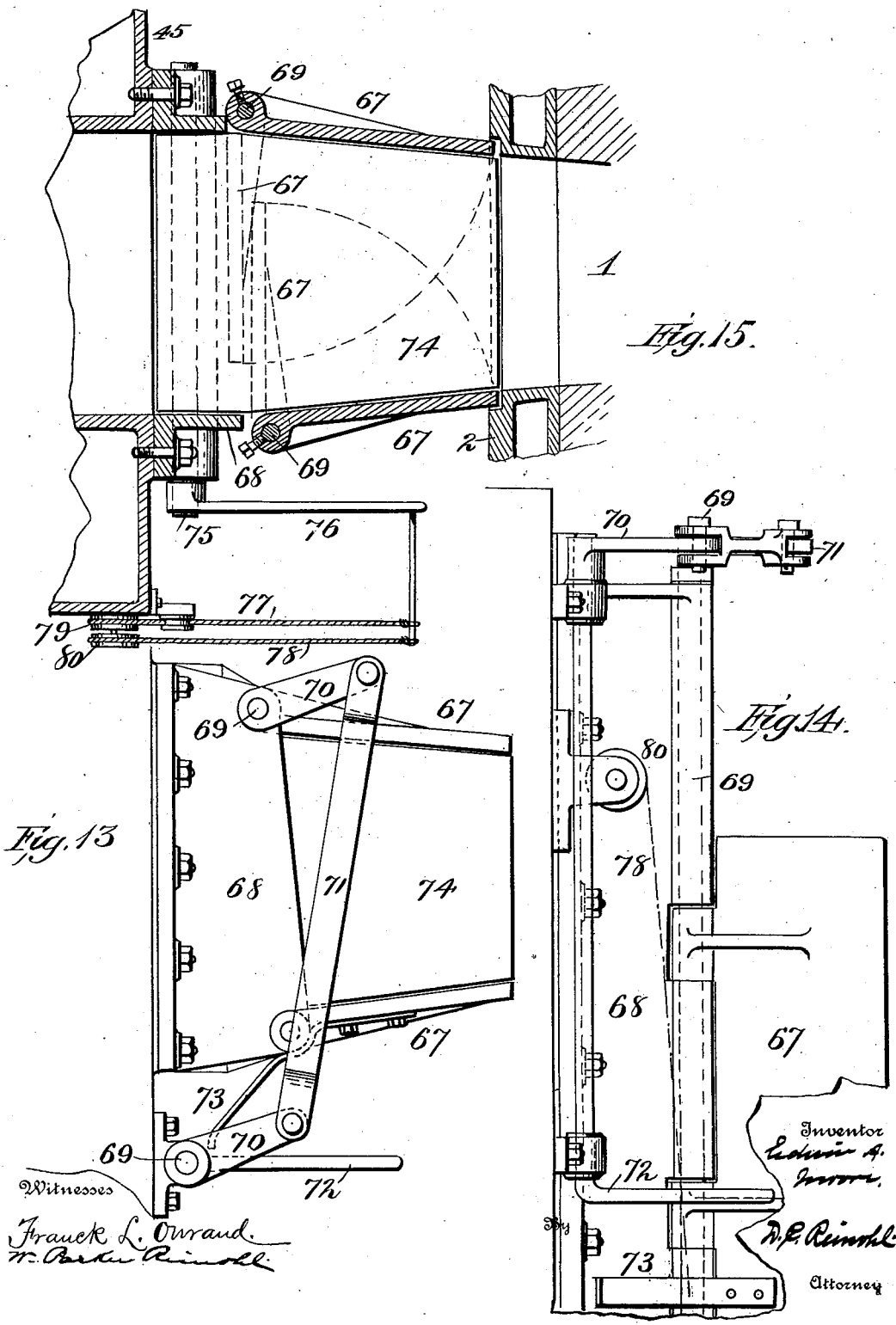

No. 755,154. PATENTED MAR. 22, 1904.
E. A. MOORE.
COKE QUENCHING AND BLEACHING APPARATUS.
APPLICATION FILED SEPT. 18, 1902. RENEWED AUG. 26, 1903.
NO MODEL. 9 SHEETS—SHEET 9.
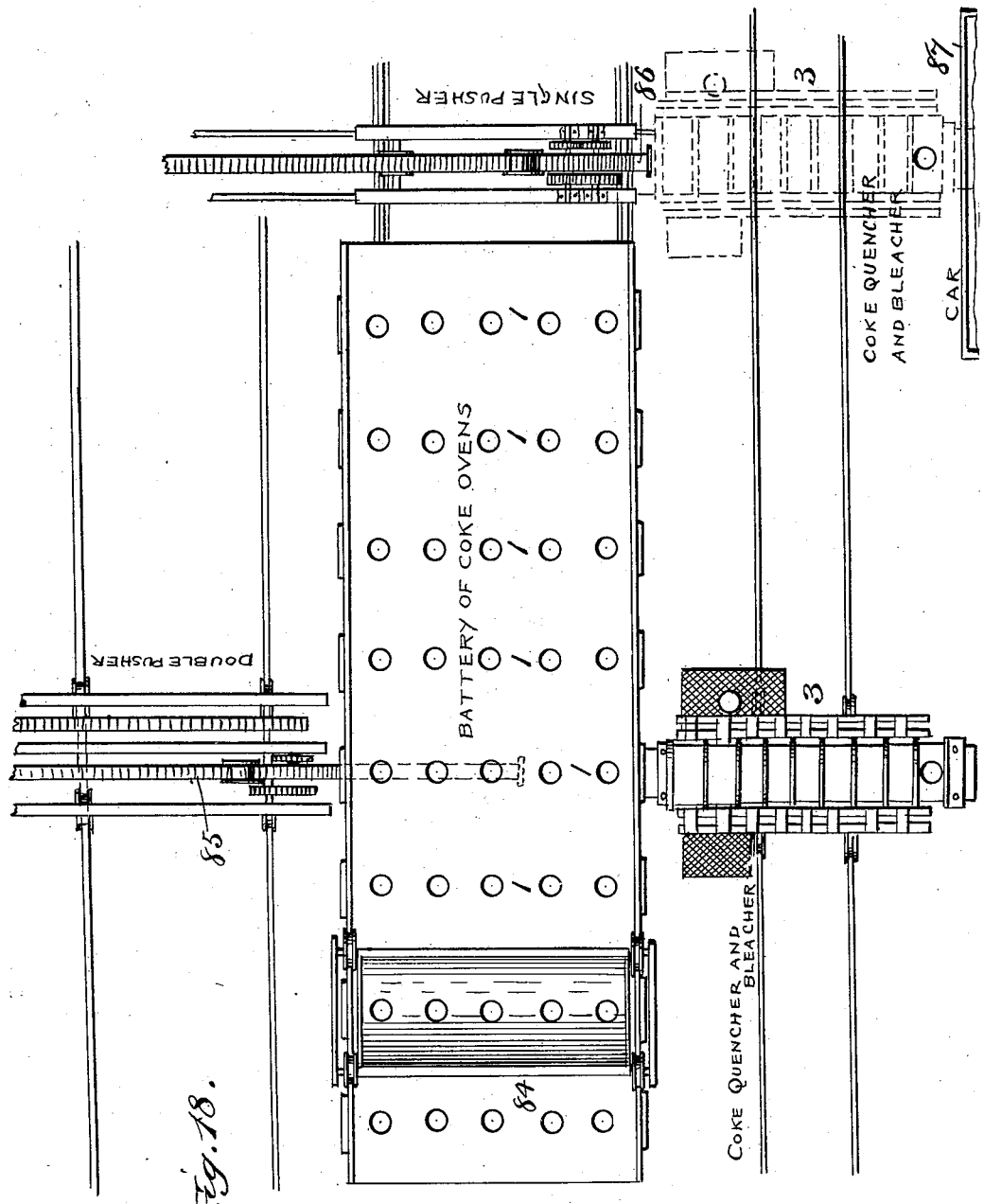

No. 755,154. Patented March 22, 1904.

UNITED STATES PATENT OFFICE.

EDWIN A. MOORE, OF PHILADELPHIA, PENNSYLVANIA.

COKE QUENCHING AND BLEACHING APPARATUS.

SPECIFICATION forming part of Letters Patent No. 755,154, dated March 22, 1904.

Application filed September 18, 1902. Renewed August 26, 1903. Serial No. 170,878. (No model.)

*To all whom it may concern:*

Be it known that I, EDWIN A. MOORE, a citizen of the United States, residing at Philadelphia, in the county of Philadelphia and State of Pennsylvania, have invented certain new and useful Improvements in Coke Quenching and Bleaching Apparatus; and I do hereby declare the following to be a full, clear, and exact description of the invention, such as will enable others skilled in the art to which it appertains to make and use the same.

My invention relates, primarily, to the art of converting coal into coke by what is known as the "Otto-Hoffman" process, has especial reference to treating the coke as it proceeds from the ovens for the purpose of quenching and bleaching it, and consists in certain improvements, which will be fully disclosed in the following specification and claims.

Figure 1:
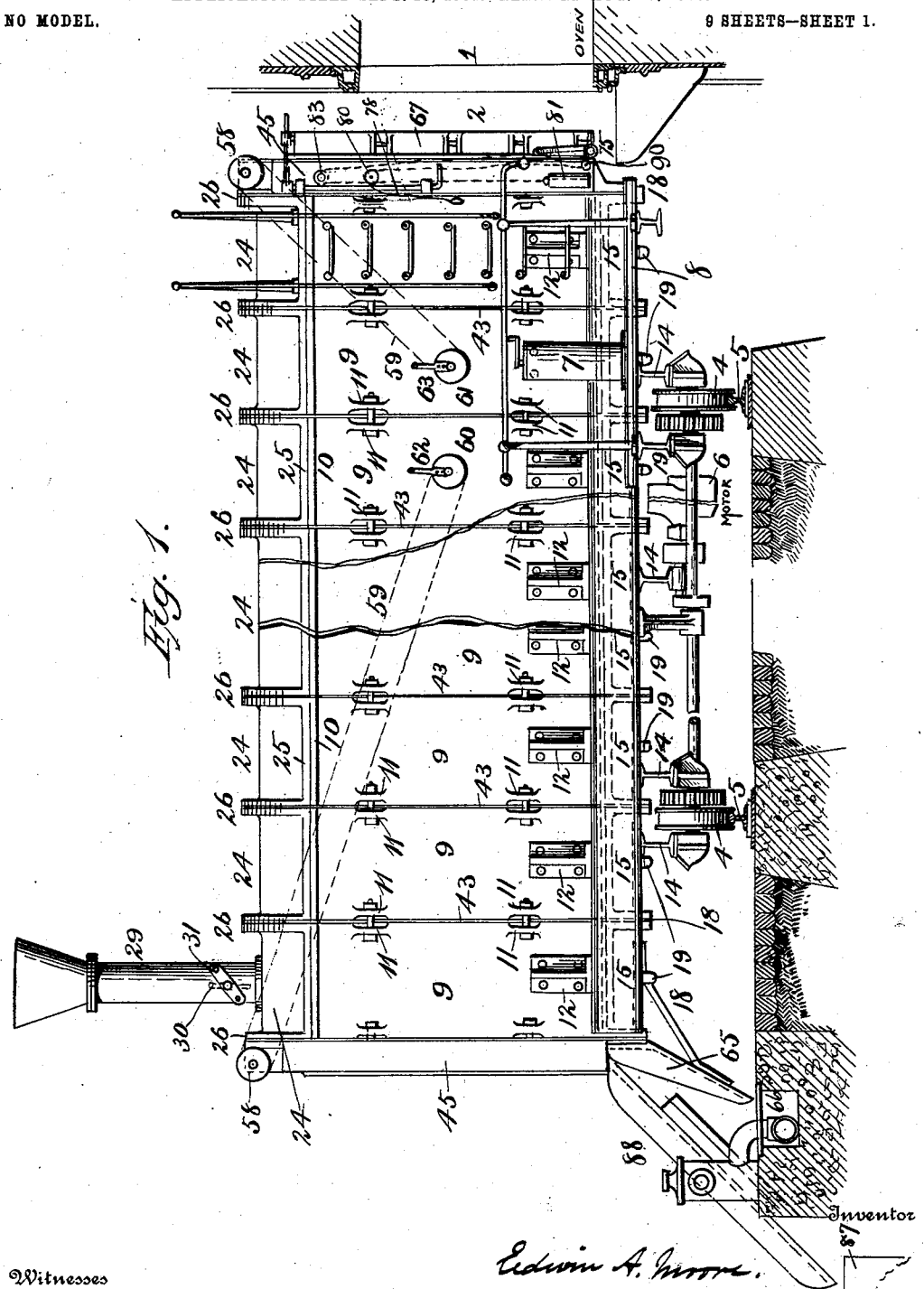
Figure 10:
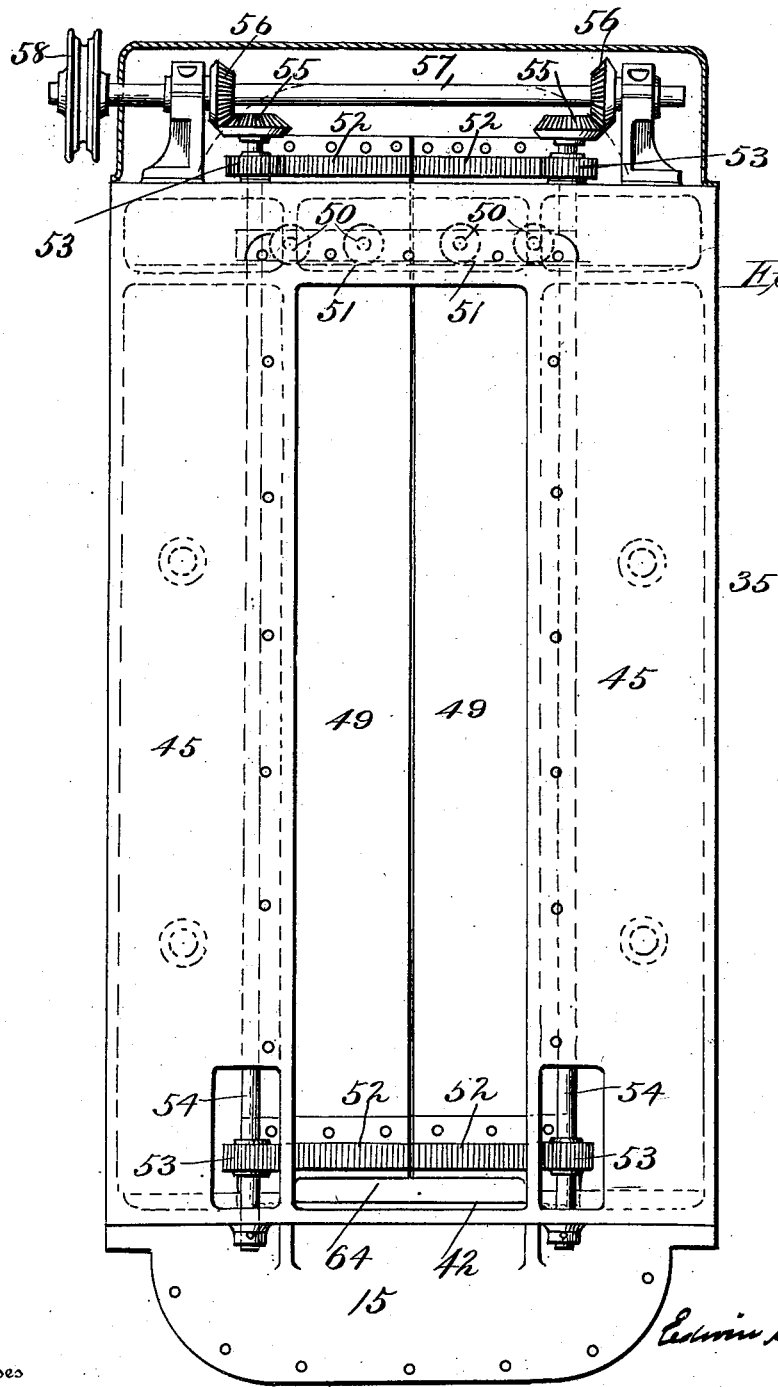

In the accompanying drawings, which form part of this specification, Figure 1 represents a side elevation of the coke quenching and bleaching apparatus and a vertical section of part of a coke-oven, the two being in relative position for use, except that the vestibule of the former is folded; Fig. 2, an elevation of the end of the apparatus, which is provided with a vestibule which connects with a coke-oven; Fig. 3, a top plan view of the apparatus; Fig. 4, a vertical transverse section on line 4 4, Fig. 3; Fig. 5, a detail horizontal section on line 5 5, Fig. 4; Fig. 6, a plan view of the bottom chamber of each section looking at the under side thereof; Fig. 7, an end view of the same; Fig. 8, a vertical transverse section on the line 8 8, Fig. 6; Fig. 9, a vertical transverse section of the bottom of the coke-chamber, forming part of each transverse section of the structure; Fig. 10, a front elevation, on an enlarged scale, of one of the door-casings and the doors at the end of the apparatus; Fig. 11, a horizontal section of the casing and its door and part of the end section of the structure; Fig. 12, a vertical longitudinal section of the same; Fig. 13, a plan view of the vestibule at one end of the apparatus; Fig. 14, a detail side elevation of the same; Fig. 15, a horizontal section of the same, showing the sides folded in dotted lines; Fig. 16, a vertical longitudinal section showing the bottom of the vestibule in engagement with the door-frame of an oven; Fig. 17, a perspective of the mechanism for raising and lowering the bottom of the vestibule; and Fig. 18 a plan view showing a battery of coke-ovens, the coke quenching and bleaching apparatus in position to receive coke from an oven in full lines and in position for the coke to be discharged at one end of the battery in dotted lines.

Reference being had to the drawings and the designating characters thereon, 1, Fig. 1, indicates a coke-oven, one of a series of ovens arranged side by side in battery, as shown in Fig. 18, and is provided with a frame 2 to receive a door (not shown) with which the ovens are provided at each end. 3 indicates a coke quenching and bleaching apparatus mounted upon wheels 4, which engage the rails 5 of a track, and the apparatus, receptacle, or car is propelled by a suitable motor 6, preferably an electric motor, connected through suitable gearing to the axle or axles of the car in any preferred manner, and the motor is electrically connected to a controller 7 on the platform 8 of the car for convenient operation by a motorman. The receptacle is composed of transverse sections having straight hollow sides 9, rectangular in cross-section, as shown in Figs. 4 and 5, provided with flanges 10 at their upper and lower ends, lugs 11 opposite each other, by which the sections are detachably connected together, so that any section can be renewed without disturbing any other section in the structure. Each section is provided with brackets 12, secured to the sides 9, which rest upon the sills 13, which extend the length of the structure and in turn are supported on beams 14, which rest upon the truck of the car, as shown in Figs. 1, 2, 3, 4, and 5. Each transverse section is provided with a bottom section 15, having flanges 16, which connect with the flanges 10 of the side sections 9, has ends 17 for separating these end sections, flanges 18 for connecting the sections, and an inlet 19 for connection with a water-supply branch pipe 20, connected to a main pipe 21, extending the length of the structure and provided at its supply end with a water-meter 22 for measuring a determined quantity of water to be supplied to the apparatus, a regulating or supply valve 23, and a hose 24 for connection with a suitable plug or hydrant. The supply-pipes are of such capacity as to provide a copious body or volume of water to deluge the coke in the coke-chamber 32 and rapidly extinguish the fire on the surface of the lumps or bodies of coke. The meter may be dispensed with and the supply of water timed so as to provide sufficient water for the work required through the proper manipulation of the valve 23. The top or cover 24 of each transverse section is provided with flanges 25, which are connected to the flanges 10 on the upper ends of the side 9, flanges 26, by which the covers are connected together to form a continuous chamber 27 throughout the length of the receptacle, and one of the covers is provided with an outlet 28, to which a stack 29, controlled by a valve 30, is attached. The valve 30 is provided with a lever 31 for operating the valve to exclude the air and to allow the steam generated in the receptacle to escape when desired, and from the lever 31 suitable connections, such as rods or chains, (not shown,) may be led to the opposite end of the structure within ready reach of the motorman on the platform 8.

32 is a coke-chamber formed between the side section 9, extends throughout the length of the structure, and is provided with a permanent bottom 33 in each transverse section, which is bolted to the inner flanges 34 of the sides 9, and at each end of this bottom is a vertical rib 35, which fills the recess 36 in the ends 17 of the bottom 15, and a water-tight joint is made between the two by a strip of asbestos, megnesia, or like material. (Not shown.) The upper end of the coke-chamber is partly closed by plates 37, secured to the inner flanges 38 at the upper ends of the sides 9, and these plates are provided with vertical flanges 39, to which vertically-adjustable water-leveling boards 40 are secured, to maintain the level of the water in the chamber 27 and a constant flow thereof through the passage 41 when the apparatus is on a track or road-bed that is not level. This is accomplished by lowering the board 40 on the side of the structure on which the track or road-bed is high or raised and raising the board on the opposite side of the passage 41.

The several parts of the sections of the structure thus far described are made of cast-iron, and to protect the permanent bottom of the coke-chamber a secondary and detached bottom of rolled sheet metal 42 is inserted at one end of the chamber, on which the coke rests while being treated and on which the body of coke and the head of the pusher rest while the coke is being discharged from the coke-chamber.

The joints between the transverse sections are packed by inserting sheets 43 of asbestos or magnesia between them, and an additional packing 44, of sal-ammoniac and iron-filings, may be provided, as shown in Fig. 5, to prevent the escape of water between the sections.

At each end of the structure is a hollow casing 45, connected thereto by bolts 46, engaging lugs 47, as shown in Figs. 1 and 11, and by bolts 48, engaging flange 26 of the covers 24, and flange 18 of the bottom 15, and in said casings are laterally-movable doors 49, supported on rollers 50, for closing the ends of the coke-chamber 32 to exclude atmospheric air while the coke is being quenched and bleached, there being a discoloring of the coke effected by exposure to the constituent parts of the atmosphere. The rollers 50 rest upon tracks 51, and on the face of each door, preferably near each end thereof, is secured a toothed rack 52, which is engaged by pinions 53, mounted upon vertical rods 54, having a miter gear-wheel 55 at their upper ends, and are revolved by like miter gear-wheels 56 on shafts 57, provided with a pulley 58, engaged by a chain 59, also engaging pulleys 60 and 61, repectively, (see Fig. 1,) and operated by a crank 62 or 63 on said pulleys 60 and 61. The doors 49 are manipulated from the platform 8 by the motorman and are opened and closed as occasion requires, and at the lower end of the doors is a discharge-passage 64 for the water from the coke-chamber, and the water is conducted through a chute 65 to a trough 66, running the length of the battery of ovens. The structure in practice has a fall of about six inches to insure a ready flow of the water toward the discharge-opening 64.

At one end of the structure is a vestibule, formed by laterally-swinging side doors 67, hinged to the box-frame 68 by pins 69, having cranks 70, which are connected to a bar 71 and operated by a lever 72, as shown in Figs. 13, 14, and 15. The doors 67 being constructed and arranged to fold in upon each other, as shown in dotted lines in Fig. 15, outward movement of said doors is limited by stops 73, only one of which is shown in Figs. 13 and 14. The bottom 74 of the vestibule swings vertically on its hinge-rod 75 and is raised and lowered by a crank 76, to which wire cables 77 78 are attached and pass over pulleys 79, 80, and 90, respectively, and to the bottom 74 is also attached a counterbalance 81, suspended on cable 82 and which passes over pulley 83, as shown in Fig. 17. The doors 67 and the bottom 74 are designed to engage with the door-frame 2 of the oven 1 to make a comparatively tight joint when the contents of an oven are to be discharged into the coke-chamber 32.

Reference being had to Fig. 18, the ovens 1 are shown in battery, on which is mounted a coal-charging car 84. On one side is the coke quenching and bleaching apparatus 3 in position to receive a charge of coke from one of the ovens as it is being discharged by the pusher 85 on the opposite side of the battery. After the coke has been treated in the apparatus 3 it is propelled to one end of the battery, where the coke is discharged therefrom by another pusher, 86, into a car 87 over chute 88. (Shown in Fig. 1.)

The operation of quenching and bleaching coke is as follows: The apparatus having been moved into position opposite a coke-oven, the vestibule extended and connected with the mouth of the open, the doors 49 at the end adjacent the oven opened, and the door at the opposite end closed, the oven-door is removed through the open top of the vestibule, when the pusher 85 discharges the coke from the oven into the coke-chamber of the apparatus 3. The doors 49 49 and the valve in the stack are then closed to exclude the atmosphere and the doors and bottom of the vestibule folded, when water is supplied to the coke in as great volume as the pipes will admit to suddenly deluge the coke and extinguish the surface-fire, the water running off freely after the coke has been deluged. The heat in the body of the coke then generates steam from the water on the surface of the coke, and this steam is allowed to pass off through the stack 29 to prevent injury to the apparatus, the steam acting as a bleaching medium, and as it passes off through the stack the coke is gradually dried off by the heat still retained by it and by the heat in the walls of the coke-chamber. The apparatus is then placed in position opposite the pusher 86, the doors 49 49 at both ends opened, and the coke discharged from the chamber 32 into a car 87 or other suitable receptacle.

The process involved in my invention will form subject-matter of a separate application for a patent.

Having thus fully described my invention, what I claim is—

1. A coke quenching and bleaching apparatus, consisting of a receptacle provided with laterally-movable doors at both its ends, means for supplying water thereto, an outlet for water at the bottom and at one end of the receptacle, an outlet for steam, and means for controlling said outlet.

2. A coke quenching and bleaching apparatus, consisting of a receptacle composed of separable hollow transverse sections, doors at each end of the receptacle, means for supplying water to each section, an outlet for water at one end of the receptacle, and an outlet for steam.

3. A coke quenching and bleaching apparatus, consisting of a receptacle provided with a vestibule or extension for engagement with a coke-oven, doors separate from the vestibule at both ends of the receptacle, means for supplying water thereto, an outlet for steam, and means for controlling said outlet.

4. A coke quenching and bleaching apparatus, consisting of a receptacle composed of separable hollow transverse sections, a vestibule or extension at one end for engagement with a coke-oven, doors at both ends of the receptacle, means for supplying water to each section, an outlet for steam, and means for controlling said outlet to exclude air, and to allow the escape of steam.

5. A coke quenching and bleaching apparatus, consisting of a receptacle provided with a foldable vestibule or extension, laterally-movable doors at both ends of the receptacle, means for supplying water thereto, an outlet for steam, and means for controlling said outlet.

6. A coke quenching and bleaching apparatus, consisting of a receptacle composed of separable hollow transverse sections, a vestibule having foldable sides and bottom at one end of the receptacle for engagement with a coke-oven, doors at both ends of the receptacle, means for supplying water to each section, an outlet for steam, and means for controlling said outlet to exclude air, and to allow the escape of steam.

7. A coke quenching and bleaching apparatus, consisting of a receptacle having doors at both ends, and provided with a vestibule or extension at one end having laterally-swinging sides and a vertically-swinging bottom for engagement with a coke-oven, means for swinging said sides, means for lowering and raising said bottom, and means for supplying water to the receptacle.

8. A coke quenching and bleaching apparatus, consisting of a receptacle composed of separable hollow transverse sections, a vestibule or extension at one end having laterally-swinging sides and a vertically-swinging bottom for engagement with a coke-oven, doors at both ends of the receptacle, means for supplying water to each section, an outlet for steam, and means for controlling said outlet to exclude air, and to allow the escape of steam.

9. A receptacle for coke provided with doors at both ends thereof, and having a vestibule provided with laterally-swinging sides, and a vertically-swinging bottom, and means for operating said sides and bottom to fold them upon each other.

10. A receptacle for coke having a box-frame at one end, a vestibule provided with laterally-swinging sides and a vertically-swinging bottom pivotally connected to said box-frame and constructed to fold upon each other, and means for operating said sides and bottom.

11. A coke quenching and bleaching apparatus, consisting of a receptacle provided with laterally-movable doors at one end, a vestibule or extension outside the doors, and means for supplying water to the receptacle.

12. A coke quenching and bleaching apparatus, consisting of a receptacle provided with laterally-movable doors, racks on the doors, pinions engaging said racks, and means for supplying water to the receptacle.

13. A coke quenching and bleaching apparatus, consisting of a receptacle, having a hollow casing or frame at one end, laterally-movable doors within the casing, means for moving the doors, and means for supplying water to the receptacle.

14. A coke quenching and bleaching apparatus, consisting of a receptacle composed of separate hollow sections detachably secured together at their adjacent ends, and means for supplying water to each section.

15. A coke quenching and bleaching apparatus, consisting of a receptacle composed of hollow transverse sections, separated at their lower ends and in communication at their upper ends, and means for supplying water thereto.

16. A coke quenching and bleaching apparatus, consisting of a receptacle composed of hollow transverse sections having separable sides and ends, and means for supplying water thereto.

17. A coke quenching and bleaching apparatus, consisting of a receptacle composed of separable hollow transverse sections, and means for supplying water thereto.

18. A coke quenching and bleaching apparatus, consisting of a receptacle provided with hollow sections composed of sides having flanges at both ends, a top section open at its ends, and a bottom section having transverse ends.

19. A coke quenching and bleaching apparatus, consisting of a receptacle provided with hollow transverse sections composed of sides having flanges at both ends, a top section open at its ends, a bottom section having transverse ends, and a detachable bottom between the sides.

20. A coke quenching and bleaching apparatus, consisting of a receptacle having a coke-chamber, a chamber above the coke-chamber, a passage between said chambers, water-leveling devices controlling said passage, and means for supplying water to the coke-chamber.

21. A coke quenching and bleaching apparatus, consisting of a receptacle composed of hollow sections forming a coke-chamber, a permanent bottom for said coke-chamber in each section, a separate and renewable supplemental bottom, and means for supplying water to the coke-chamber.

22. A coke quenching and bleaching apparatus, consisting of a receptacle having hollow sections, and packing interposed between the adjacent ends of the sections.

23. A coke quenching and bleaching apparatus, consisting of a movable receptacle having a coke-chamber therein; in combination with a coke-oven, a pusher for discharging coke from the oven into said receptacle, and a separate pusher for discharging the coke from the receptacle.

In testimony whereof I affix my signature in presence of two witnesses.

EDWIN A. MOORE.

Witnesses:
D. C. REINOHL,
C. W. METCALFE.